US012574991B2

(12) United States Patent
Hong et al.

(10) Patent No.: US 12,574,991 B2
(45) Date of Patent: Mar. 10, 2026

(54) METHOD FOR CONNECTION INDICATION, METHOD FOR CONNECTION ADJUSTMENT AND ELECTRONIC DEVICE

(71) Applicant: BEIJING XIAOMI MOBILE SOFTWARE CO., LTD., Beijing (CN)

(72) Inventors: Wei Hong, Beijing (CN); Weiyan Ge, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 418 days.

(21) Appl. No.: 18/249,790

(22) PCT Filed: Oct. 23, 2020

(86) PCT No.: PCT/CN2020/123411
§ 371 (c)(1),
(2) Date: Apr. 20, 2023

(87) PCT Pub. No.: WO2022/082776
PCT Pub. Date: Apr. 28, 2022

(65) Prior Publication Data
US 2023/0389118 A1 Nov. 30, 2023

(51) Int. Cl.
*H04W 76/27* (2018.01)
*H04W 68/02* (2009.01)
*H04W 88/06* (2009.01)

(52) U.S. Cl.
CPC ........... *H04W 76/27* (2018.02); *H04W 68/02* (2013.01); *H04W 88/06* (2013.01)

(58) Field of Classification Search
CPC ..... H04W 76/27; H04W 68/02; H04W 88/06; H04W 8/20; H04W 76/20

USPC ......................................................... 455/458
See application file for complete search history.

(56) References Cited

U.S. PATENT DOCUMENTS

| | | | | |
|---|---|---|---|---|
| 12,035,394 | B2 * | 7/2024 | Gurumoorthy | ....... H04W 76/16 |
| 12,133,281 | B2 * | 10/2024 | Sun | ........................... H04L 5/00 |
| 12,185,403 | B2 * | 12/2024 | Zhang | ................... H04W 76/27 |
| 2017/0048781 | A1 | 2/2017 | Jung et al. | |
| 2023/0047213 | A1 * | 2/2023 | Chen | ................... H04W 74/002 |

(Continued)

FOREIGN PATENT DOCUMENTS

| | | |
|---|---|---|
| CN | 103517454 A | 1/2014 |
| CN | 103747493 A | 4/2014 |

(Continued)

OTHER PUBLICATIONS

Claims machine translation document dated Dec. 7, 2023 for Application No. CN 202080002836. (Year: 2023).*

(Continued)

*Primary Examiner* — Juan A Torres
(74) *Attorney, Agent, or Firm* — Oblon, McClelland, Maier & Neustadt, L.L.P.

(57) ABSTRACT

The present disclosure provides a method for a connection indication, which includes receiving request information for leaving a connected state sent by a first SIM card in a terminal, wherein the request information includes a leaving reason for leaving the connected state; and sending, according to the leaving reason, indication information to the terminal, wherein the indication information is used to indicate the first SIM card to enter a non-connected state or not to enter the non-connected state.

18 Claims, 10 Drawing Sheets the request information for leaving a connected state is sent to a base station by the first SIM card, and the request information includes a leaving reason for leaving the connected state ⟿ S801 the first SIM card is adjusted to enter a non-connected state or not to enter a non-connected state according to indication information received from the base station ⟿ S802 a time for the first SIM card to enter the non-connected state is determined according to the indication information ⟿ S901

(56)     References Cited

U.S. PATENT DOCUMENTS

| | | | | |
|---|---|---|---|---|
| 2023/0189268 A1* | 6/2023 | Kim | ...................... | H04W 72/21 |
| | | | | 370/329 |
| 2023/0262657 A1* | 8/2023 | Kim | ...................... | H04W 68/02 |
| | | | | 455/458 |

FOREIGN PATENT DOCUMENTS

| | | | |
|---|---|---|---|
| CN | 104115454 | A | 10/2014 |
| CN | 106162595 | A | 11/2016 |
| CN | 107548055 | A | 1/2018 |
| CN | 108924887 | A | 11/2018 |
| CN | 108990122 | A | 12/2018 |
| CN | 110249655 | A | 9/2019 |

OTHER PUBLICATIONS

The second notice of examination opinions (Translated) dated Sep. 26, 2023 for Application No. CN 202080002836. (Year: 2023).*
First notice of examination opinion (Translated) dated Mar. 1, 2023 for Application No. CN 202080002836 (Year: 2023).*
Claims machine translation document dated Jul. 17, 2023 for Application No. CN 202080002836 (Year: 2023).*
Claims machine translation document dated Nov. 18, 2020 for Application No. CN 202080002836 (Year: 2020).*
International Search Report with English translation mailed on Jul. 21, 2021 in PCT/CN2020/123411 filed on Oct. 23, 2020 (6 pages).
First Chinese Office Action mailed on Mar. 1, 2023 in Chinese Application No. 202080002836.9 (6 pages).

* cited by examiner

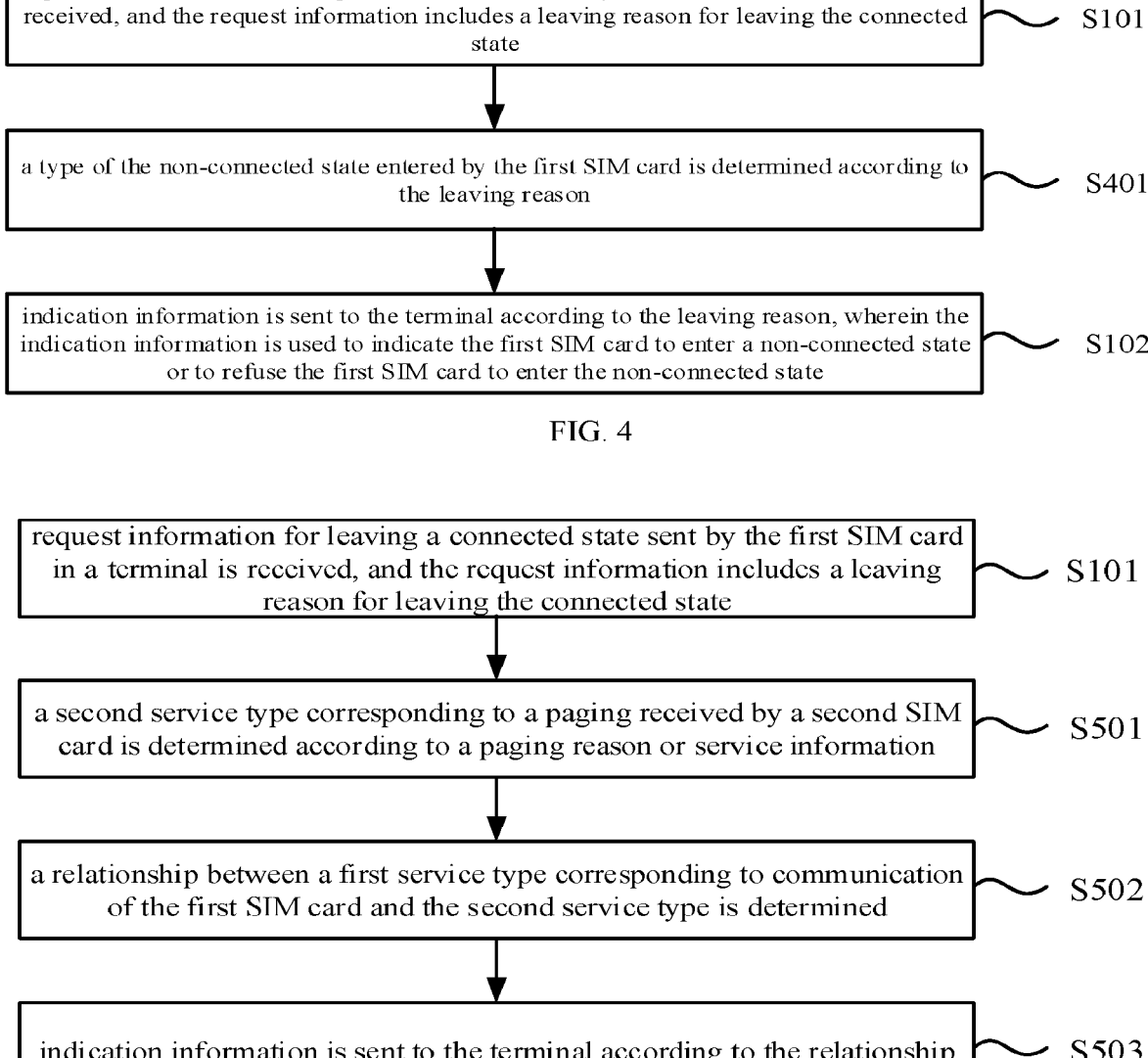

request information for leaving a connected state sent by the first SIM card in a terminal is received, and the request information includes a leaving reason for leaving the connected state — S101 a type of the non-connected state entered by the first SIM card is determined according to the leaving reason — S401 indication information is sent to the terminal according to the leaving reason, wherein the indication information is used to indicate the first SIM card to enter a non-connected state or to refuse the first SIM card to enter the non-connected state — S102

FIG. 4 request information for leaving a connected state sent by the first SIM card in a terminal is received, and the request information includes a leaving reason for leaving the connected state — S101 a second service type corresponding to a paging received by a second SIM card is determined according to a paging reason or service information — S501 a relationship between a first service type corresponding to communication of the first SIM card and the second service type is determined — S502 indication information is sent to the terminal according to the relationship — S503

FIG. 5

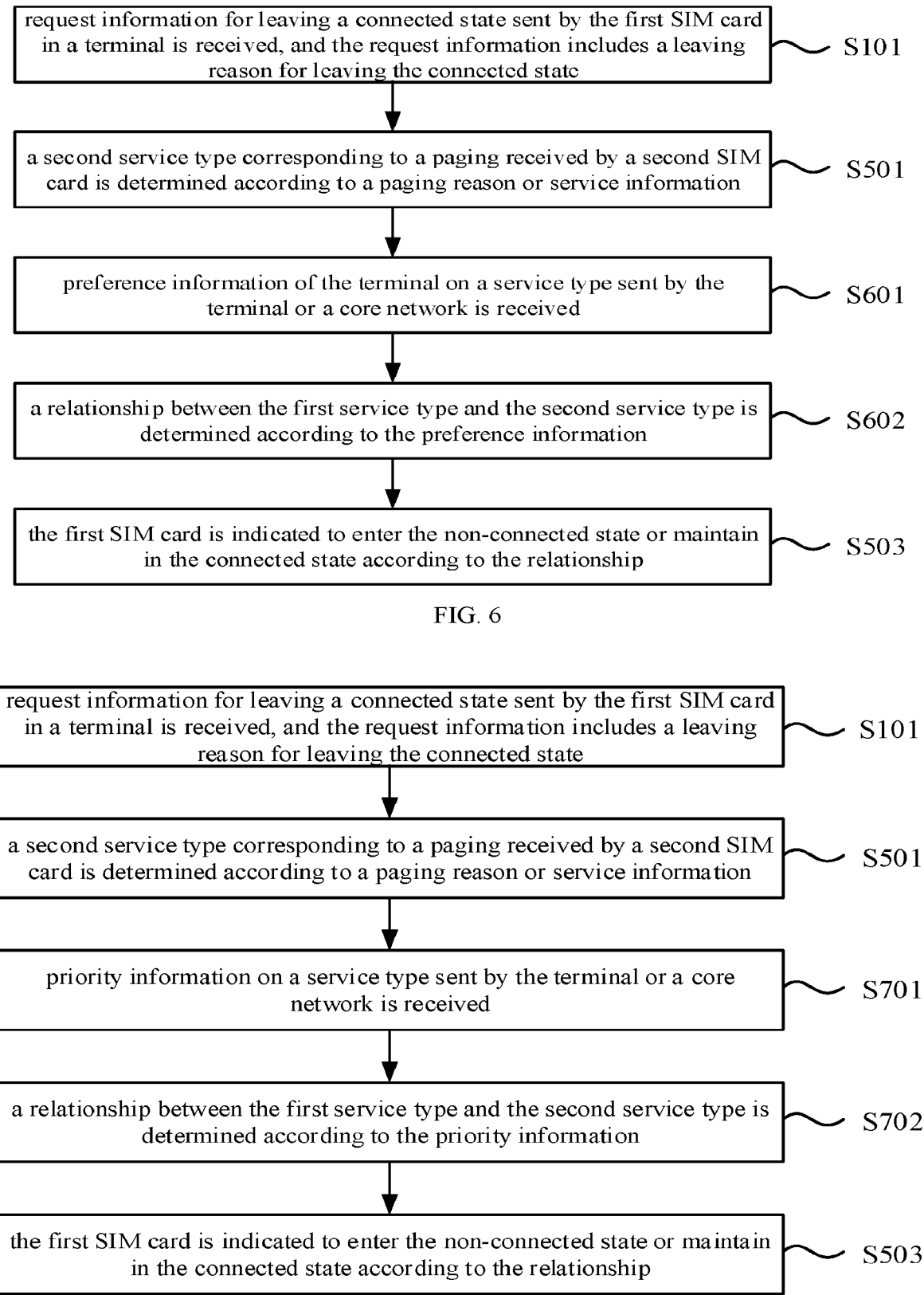

request information for leaving a connected state sent by the first SIM card in a terminal is received, and the request information includes a leaving reason for leaving the connected state — S101 a second service type corresponding to a paging received by a second SIM card is determined according to a paging reason or service information — S501 preference information of the terminal on a service type sent by the terminal or a core network is received — S601 a relationship between the first service type and the second service type is determined according to the preference information — S602 the first SIM card is indicated to enter the non-connected state or maintain in the connected state according to the relationship — S503

FIG. 6 request information for leaving a connected state sent by the first SIM card in a terminal is received, and the request information includes a leaving reason for leaving the connected state — S101 a second service type corresponding to a paging received by a second SIM card is determined according to a paging reason or service information — S501 priority information on a service type sent by the terminal or a core network is received — S701 a relationship between the first service type and the second service type is determined according to the priority information — S702 the first SIM card is indicated to enter the non-connected state or maintain in the connected state according to the relationship — S503

FIG. 7

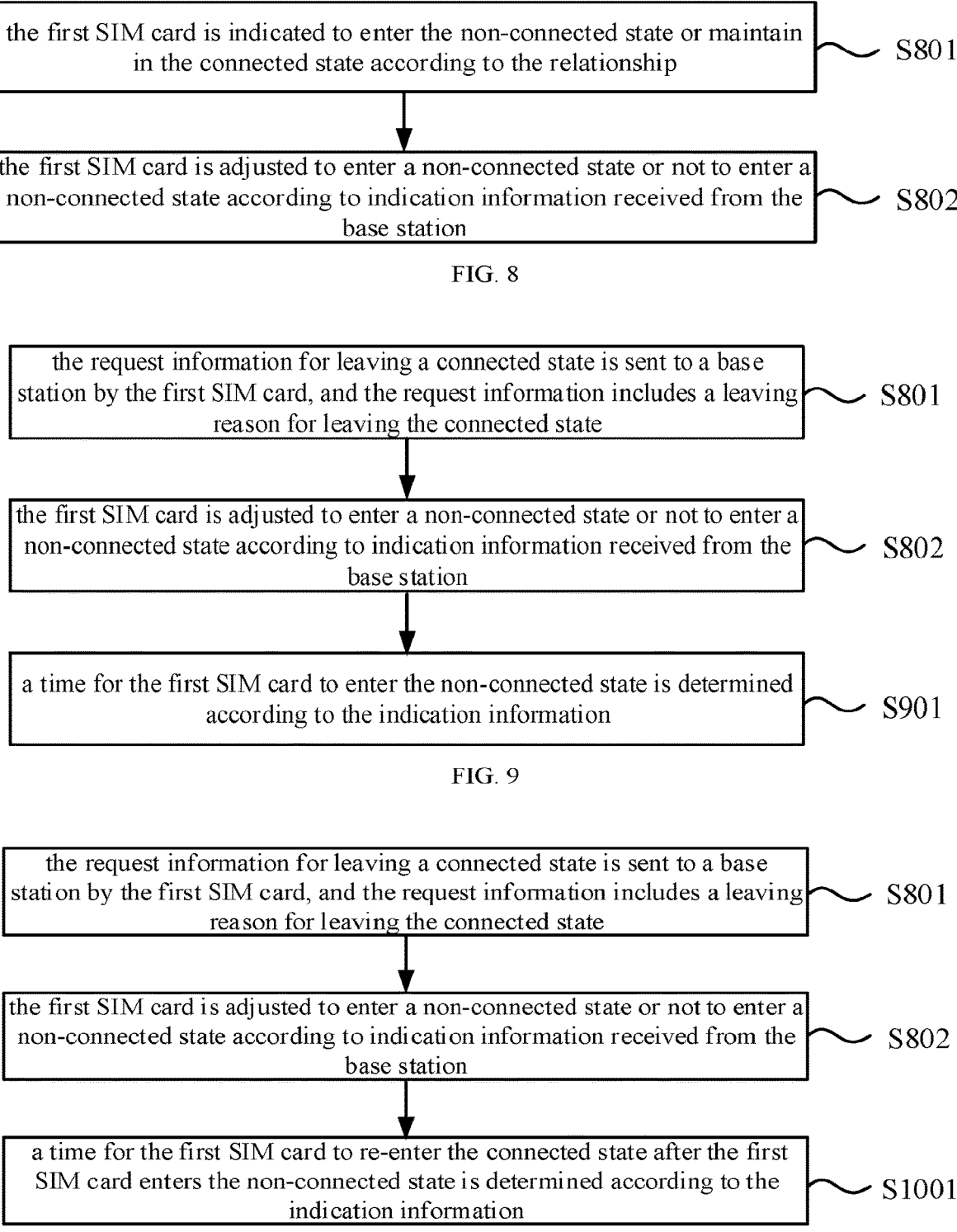

the first SIM card is indicated to enter the non-connected state or maintain in the connected state according to the relationship  ~ S801 the first SIM card is adjusted to enter a non-connected state or not to enter a non-connected state according to indication information received from the base station  ~ S802

FIG. 8 the request information for leaving a connected state is sent to a base station by the first SIM card, and the request information includes a leaving reason for leaving the connected state  ~ S801 the first SIM card is adjusted to enter a non-connected state or not to enter a non-connected state according to indication information received from the base station  ~ S802 a time for the first SIM card to enter the non-connected state is determined according to the indication information  ~ S901

FIG. 9 the request information for leaving a connected state is sent to a base station by the first SIM card, and the request information includes a leaving reason for leaving the connected state  ~ S801 the first SIM card is adjusted to enter a non-connected state or not to enter a non-connected state according to indication information received from the base station  ~ S802 a time for the first SIM card to re-enter the connected state after the first SIM card enters the non-connected state is determined according to the indication information  ~ S1001

FIG. 10

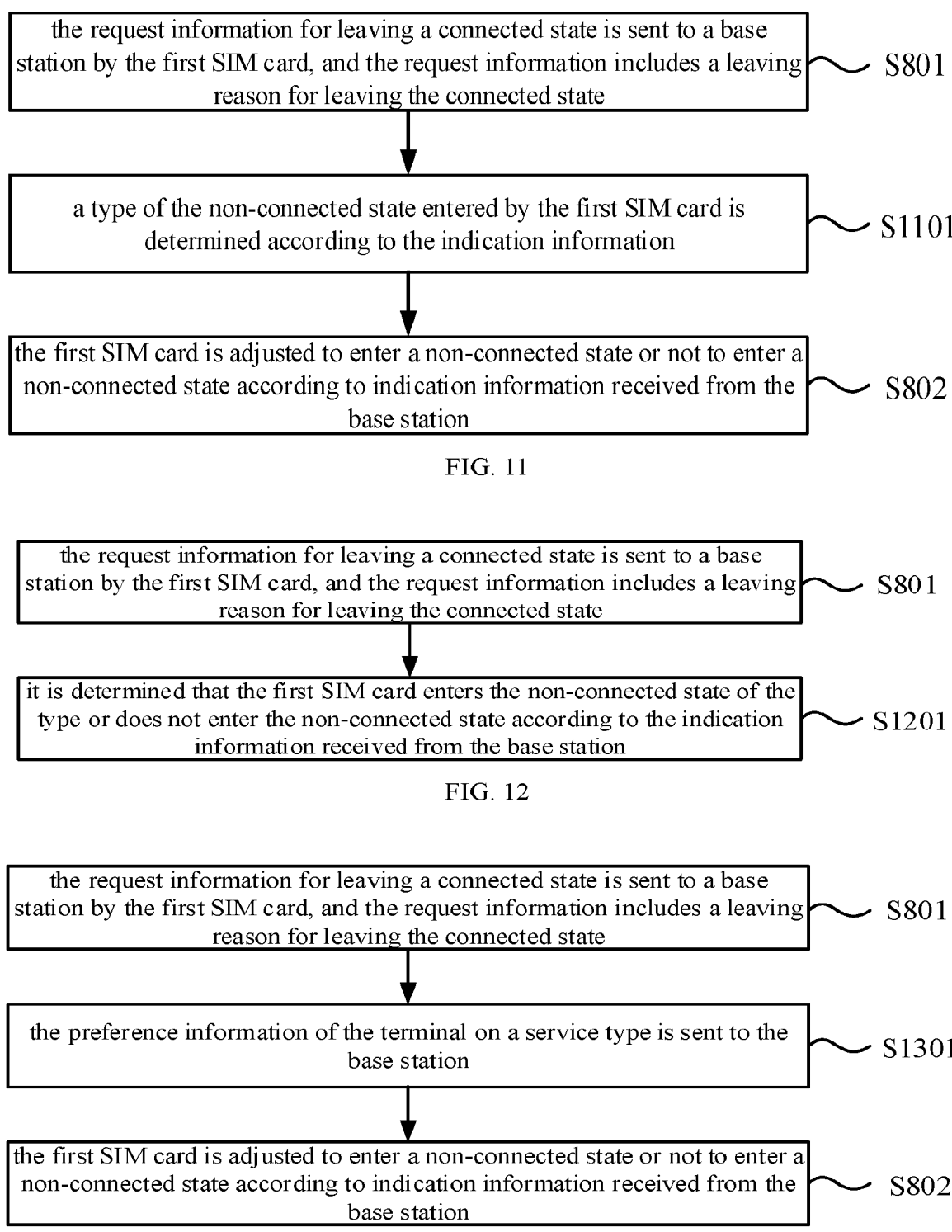

the request information for leaving a connected state is sent to a base station by the first SIM card, and the request information includes a leaving reason for leaving the connected state    S801 a type of the non-connected state entered by the first SIM card is determined according to the indication information    S1101 the first SIM card is adjusted to enter a non-connected state or not to enter a non-connected state according to indication information received from the base station    S802

FIG. 11 the request information for leaving a connected state is sent to a base station by the first SIM card, and the request information includes a leaving reason for leaving the connected state    S801 it is determined that the first SIM card enters the non-connected state of the type or does not enter the non-connected state according to the indication information received from the base station    S1201

FIG. 12 the request information for leaving a connected state is sent to a base station by the first SIM card, and the request information includes a leaving reason for leaving the connected state    S801 the preference information of the terminal on a service type is sent to the base station    S1301 the first SIM card is adjusted to enter a non-connected state or not to enter a non-connected state according to indication information received from the base station    S802

FIG. 13

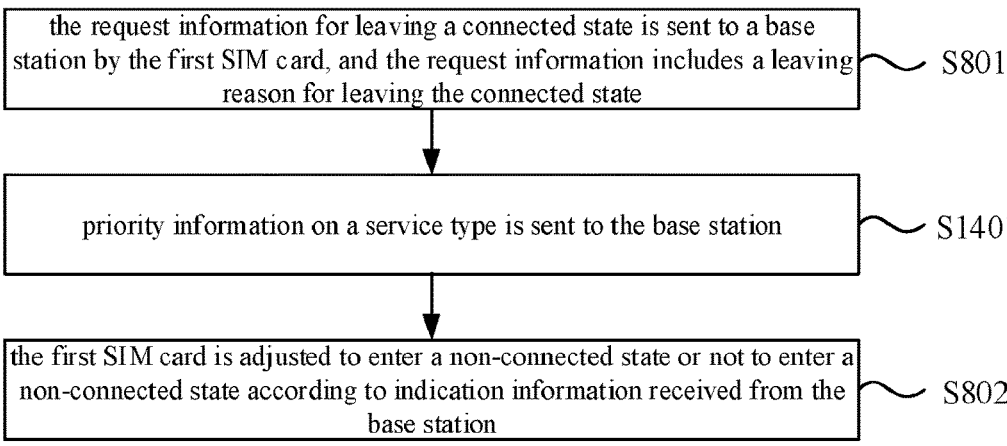

the request information for leaving a connected state is sent to a base station by the first SIM card, and the request information includes a leaving reason for leaving the connected state ~ S801 priority information on a service type is sent to the base station ~ S1401 the first SIM card is adjusted to enter a non-connected state or not to enter a non-connected state according to indication information received from the base station ~ S802

FIG. 14

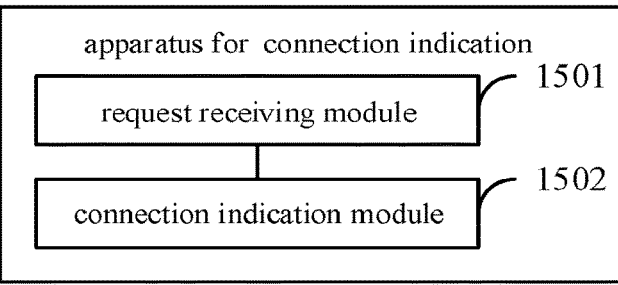

apparatus for connection indication request receiving module ~ 1501 connection indication module ~ 1502

FIG. 15

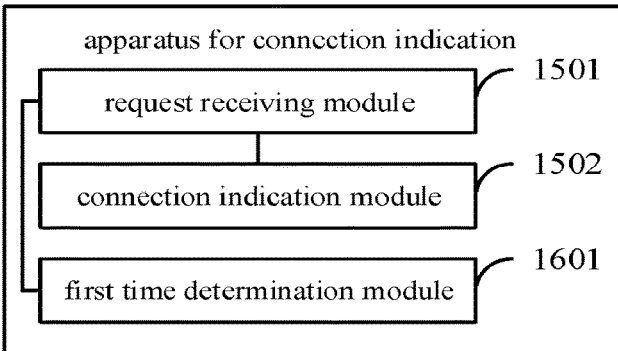

apparatus for connection indication request receiving module ~ 1501 connection indication module ~ 1502 first time determination module ~ 1601

FIG. 16

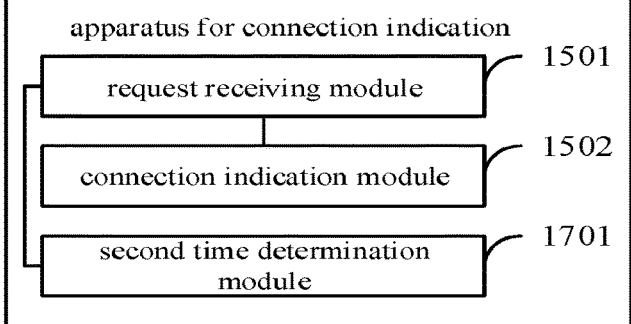

apparatus for connection indication request receiving module ~ 1501 connection indication module ~ 1502 second time determination module ~ 1701

FIG. 17

METHOD FOR CONNECTION INDICATION, METHOD FOR CONNECTION ADJUSTMENT AND ELECTRONIC DEVICE

CROSS-REFERENCE TO RELATED APPLICATIONS

The present application is a U.S. National Stage of International Application No. PCT/CN2020/123411, filed on Oct. 23, 2020, the entire content of which is incorporated herein by reference for all purposes.

TECHNICAL FIELD

The present disclosure relates to a field of communication technology, and more particularly to a method for a connection indication, a method for a connection adjustment, an apparatus for a connection indication, an apparatus for a connection adjustment, an electronic device and a computer-readable storage medium.

BACKGROUND

In a multi-card terminal, the terminal may perform communication through a plurality of SIM (Subscriber Identity Module) cards. When one of the SIM cards is communicating, there may be a case where another SIM card needs to communicate, thereby causing a communication conflict. For example, if SIM card #1 is communicating in a connected state and SIM card #2 receives paging information, an action of the SIM card #2 in response to the paging information conflicts with the ongoing communication of the SIM card #1.

SUMMARY

In view of above, embodiments of the present disclosure propose a method for a connection indication, a method for a connection adjustment, and an electronic device.

According to a first aspect of embodiments of the present disclosure, a method for a connection indication is provided, the method is applied to a base station and includes:

receiving request information for leaving a connected state sent by a first SIM card in a terminal, wherein the request information includes a leaving reason for leaving the connected state;

sending, according to the leaving reason, indication information to the terminal, wherein the indication information is used to indicate the first SIM card to enter a non-connected state or to refuse the first SIM card to enter the non-connected state.

According to a second aspect of embodiments of the present disclosure, a method for a connection adjustment is provided, the method is applied to a terminal, wherein at least a first SIM card and a second SIM card are provided in the terminal, and the method includes:

sending, by the first SIM card, request information for leaving a connected state to a base station, wherein the request information includes a leaving reason for leaving the connected state;

adjusting, according to indication information received from the base station, the first SIM card to enter a non-connected state or not to enter the non-connected state.

According to a third aspect of embodiments of the present disclosure, an electronic device is provided and includes:

a processor;

a memory configured to store instructions executable by the processor;

wherein the processor is configured to execute: the above method for the connection indication.

According to a fourth aspect of embodiments of the present disclosure, an electronic device, including:

a processor;

a memory configured to store instructions executable by the processor;

wherein the processor is configured to execute the above method for the connection adjustment.

BRIEF DESCRIPTION OF THE DRAWINGS

To illustrate solutions in embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without paying creative efforts.

FIG. 4 is a schematic flowchart illustrating yet another method for a connection indication according to an embodiment of the present disclosure.

FIG. 5 is a schematic flowchart illustrating yet another method for a connection indication according to an embodiment of the present disclosure.

FIG. 6 is a schematic flowchart illustrating yet another method for a connection indication according to an embodiment of the present disclosure.

FIG. 7 is a schematic flowchart illustrating yet another method for a connection indication according to an embodiment of the present disclosure.

FIG. 8 is a schematic flowchart illustrating a method for a connection adjustment according to an embodiment of the present disclosure.

FIG. 9 is a schematic flowchart illustrating another method for a connection adjustment according to an embodiment of the present disclosure.

FIG. 10 is a schematic flowchart illustrating yet another method for a connection adjustment according to an embodiment of the present disclosure.

FIG. 11 is a schematic flowchart illustrating yet another method for a connection adjustment according to an embodiment of the present disclosure.

FIG. 12 is a schematic flowchart illustrating yet another method for a connection adjustment according to an embodiment of the present disclosure.

FIG. 13 is a schematic flowchart illustrating yet another method for a connection adjustment according to an embodiment of the present disclosure.

FIG. 14 is a schematic flowchart illustrating yet another method for a connection adjustment according to an embodiment of the present disclosure.

FIG. 15 is a schematic block diagram illustrating an apparatus for a connection indication shown according to an embodiment of the present disclosure.

FIG. 16 is a schematic block diagram illustrating another apparatus for a connection indication shown according to an embodiment of the present disclosure.

FIG. 17 is a schematic block diagram illustrating yet another apparatus for a connection indication shown according to an embodiment of the present disclosure.

DETAILED DESCRIPTION

Solutions of embodiments of the present disclosure are clearly and completely described below with reference to the accompanying drawings in the embodiments of the present disclosure. Obviously, the described embodiments are merely a part of rather than all of the embodiments of the present disclosure. All other embodiments obtained by persons of ordinary skill in the art based on the embodiments of the present disclosure without paying creative efforts shall fall within the protection scope of the present disclosure.

Figures 1, 2, 3:
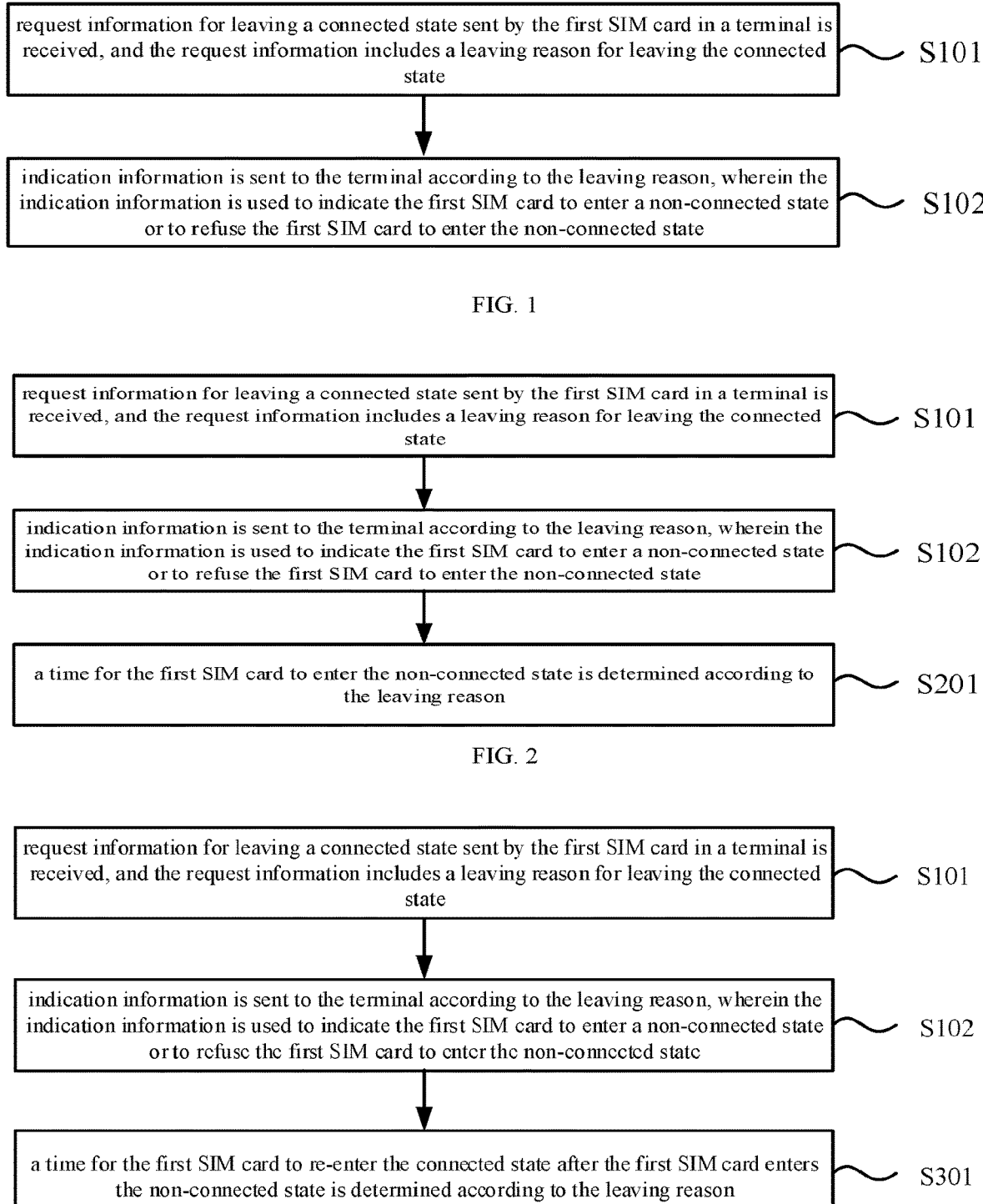
FIG. 1 is a schematic flowchart illustrating a method for a connection indication according to an embodiment of the present disclosure.
FIG. 2 is a schematic flowchart illustrating another method for a connection indication according to an embodiment of the present disclosure.
FIG. 3 is a schematic flowchart illustrating yet another method for a connection indication according to an embodiment of the present disclosure.

FIG. 1 is a schematic flowchart illustrating a method for a connection indication according to an embodiment of the present disclosure. The method for the connection indication shown in the present embodiment may be applied to a base station, which includes but is not limited to, a 4G base station, a 5G base station, and a 6G base station. The base station may communicate with a terminal serving as user equipment, and the terminal includes but not limited to, an electronic device such as a mobile phone, a tablet, a wearable device, a sensor, and an Internet of Things device, etc. In an embodiment, the terminal may be a terminal to which a method for a connection adjustment described in any subsequent embodiment is applicable.

The terminal may be provided with a plurality of SIM cards, and the plurality of SIM cards at least include a first SIM card and a second SIM card. The first SIM card and the second SIM card may belong to the same operator network or belong to different operator networks.

As shown in FIG. 1, the method for the connection indication may include the following steps S101 and S102:

In step S101, request information for leaving a connected state sent by the first SIM card in a terminal is received, and the request information includes a leaving reason for leaving the connected state;

In step S102, indication information is sent to the terminal according to the leaving reason, wherein the indication information is used to indicate the first SIM card to enter a non-connected state or to refuse the first SIM card to enter the non-connected state.

In an embodiment, when the terminal is in the connected state, if the first SIM card needs to leave the connected state and access the non-connected state, the request information for leaving the connected state may be sent to a base station in an operator network to which the first SIM card belongs. Based on the received request information, the base station may determine that the first SIM card requests to leave the connected state.

In an embodiment, when the first SIM card is in the connected state and the second SIM card needs to perform a communication operation, causing a conflict between the communication operation of the first SIM card and the communication operation of the second SIM card, the terminal may send the request information to the base station.

For example, when the first SIM card is in the connected state for communication and the second SIM card needs to respond to paging, in this case, the terminal needs to choose one of the following for execution: continue to communicate through the first SIM card and respond to the paging through the second SIM card. Thus, there is a conflict between the communication operation of communicating with the first SIM card and the communication operation of responding to the paging through the second SIM card, such that the request information may be sent to the base station.

In an embodiment, the request information may be RRC (Radio Resource Control) information, such as UEAssistanceInformation (user equipment assistance information).

In an embodiment, the request information may include the leaving reason for leaving the connected state. According to the request information, the base station may determine the leaving reason why the first SIM card leaves the connected state, then determine whether to allow the first SIM card to leave the connected state and enter the non-connected state according to the leaving reason, and after that, send the indication information to the terminal to indicate the terminal.

If the first SIM card is allowed to enter the non-connected state, the first SIM card may enter the non-connected state by sending the indication information to the first SIM card. For example, the first SIM card may enter an idle state by sending a RRC release signaling to the first SIM card, or the first SIM card may enter an inactive state by sending a RRC suspend release signaling to the first SIM card. If the first SIM card is not allowed to enter the non-connected state, and that is, if the first SIM card needs to maintain in the connected state, the first SIM card may be refused to enter the non-connected state by sending the indication information to the first SIM card.

According to the embodiment of the present disclosure, when the first SIM card in the terminal requests to leave the connected state, it may send the request information for leaving the connected state to the base station, and carry the leaving reason for leaving the connected state in the request information, such that the base station may accurately determine whether to allow the first SIM card to leave the connected state according to the leaving reason, thereby indicating the first SIM card to enter the non-connected state or to refuse the first SIM card to enter the non-connected state.

FIG. 2 is a schematic flowchart illustrating another method for a connection indication according to an embodiment of the present disclosure. As shown in FIG. 2, the method further includes step S201:

In step S201, a time for the first SIM card to enter the non-connected state is determined according to the leaving reason.

In an embodiment, the base station may also determine the time for the first SIM card to enter the non-connected state according to the leaving reason why the first SIM card leaves the connected state, and then indicate the time to the terminal, or indicate the terminal to enter the non-connected state at this time, such that the terminal may enter the non-connected state at this time.

For example, if the leaving reason is that there is a conflict between the communication operations of the first SIM card and the second SIM card that is in the terminal, and a service type corresponding to the communication operation of the second SIM card (such as URLLC service) requires a relatively low latency, it may be determined that the first SIM card immediately enters the non-connected state. For example, if the leaving reason is that there is a conflict between the communication operations of the first SIM card and the second SIM card that is in the terminal, and a service type corresponding to the communication operation of the second SIM card allows a relatively high delay, it may be determined that after a period of communication with the first SIM card, the first SIM card enters the non-connected state again.

FIG. 3 is a schematic flowchart illustrating yet another method for a connection indication according to an embodiment of the present disclosure. As shown in FIG. 3, the method further includes step S301:

In step S301, a time for the first SIM card to re-enter the connected state after the first SIM card enters the non-connected state is determined according to the leaving reason.

In an embodiment, the base station may also determine the time for the first SIM card to re-enter the connected state after the first SIM card enters the non-connected state according to the leaving reason why the first SIM card leaves the connected state, and then indicate the time to the terminal, or indicate the terminal to re-enter the connected state at this time, such that the terminal may re-enter the connected state at this time.

For example, if the leaving reason is that there is a conflict between the communication operations of the first SIM card and the second SIM card that in the terminal, and the communication operation of the second SIM card requires a relatively large amount of data to be sent (such as a video service), it may be determined that the first SIM card re-enters the connected state after a relatively long time (such as a first time-period) from current moment. For example, if the leaving reason is that there is a conflict between the communication operations of the first SIM card and the second SIM card that in the terminal, and the communication operation of the second SIM card requires a relatively small amount of data to be sent (such as a text service), it may be determined that the first SIM card re-enters the connected state after a relatively short time (such as a second time-period less than the first time-period) from current moment.

FIG. 4 is a schematic flowchart illustrating yet another method for a connection indication according to an embodiment of the present disclosure. As shown in FIG. 4, the method further includes step S401:

In step S401, a type of the non-connected state entered by the first SIM card is determined according to the leaving reason.

In an embodiment, the base station may also determine the type of the non-connected state that the first SIM card enters according to the leaving reason why the first SIM card leaves the connected state, and then indicate the first SIM card to enter the non-connected state of this type when determining that the first SIM card requests to leave the connected state.

For example, if the leaving reason is that there is a conflict between the communication operations of the first SIM card and the second SIM card that is in the terminal and the communication operation of the second SIM card takes a relatively long time, it may be determined that the type of the first SIM card entering the non-connected state is an idle state. For example, if the leaving reason is that there is a conflict between the communication operations of the first SIM card and the second SIM card that is in the terminal and the communication operation of the second SIM card takes a relatively short time, it may be determined that the type of the first SIM card entering the non-connected state is an inactive state, such that the first SIM card may quickly return to the connected state after the second SIM card completes the communication operation.

In an embodiment, the request information further includes a type of the non-connected state requested to enter, and the indication information is used to indicate the first SIM card to enter the non-connected state of the type or to refuse the first SIM card to enter the non-connected state.

In an embodiment, the request information sent by the terminal to the base station may further include the type of the non-connected state requested to enter, and the base station may determine the type of the non-connected state that the first SIM card requests to enter according to the request information, so as to indicate the first SIM card to enter the non-connected state of this type when that the first SIM card enters the non-connected state is determined according to the leaving reason, to meet the requirement of the first SIM card.

In an embodiment, the leaving reason includes at least one of the following:

a paging reason for paging received by a second SIM card in the terminal, and service information corresponding to the paging received by the second SIM card in the terminal.

In an embodiment, the leaving reason carried in the request information may be either the paging reason for the paging received by the second SIM card or the service information corresponding to the paging received by the second SIM card. Based on the paging reason or the service information, the base station may determine a second service type corresponding to the paging received by the second SIM card, and the base station knows a first service type of the ongoing communication operation of the first SIM card, and thus it may be determined whether to allow the first SIM card to leave the connected state according to a relationship between the first service type and the second service type.

FIG. 5 is a schematic flowchart illustrating yet another method for a connection indication according to an embodiment of the present disclosure. As shown in FIG. 5, the sending, according to the leaving reason, the indication information to the terminal includes steps S501, S502 and S503.

In step S501, a second service type corresponding to the paging received by the second SIM card is determined according to the paging reason or the service information;

In step S502, a relationship between a first service type corresponding to communication of the first SIM card and the second service type is determined;

In step S503, indication information is sent to the terminal according to the relationship.

In an embodiment, based on the paging reason or the service information, the base station may determine the second service type corresponding to the paging received by the second SIM card, and the base station knows the first service type of the ongoing communication operation of the first SIM card. Thus, it may be determined whether to allow the first SIM card to leave the connected state according to the relationship between the first service type and the second service type, and further send indication information to the terminal.

Due to different communication requirements for different service types, for example, some services require a relatively low latency, while others allow a relatively high latency. Thus, by determining the relationship between the first service type and second service type, it may be determined how different the communication requirements for these two service types are, such that the indicating the first SIM card to enter the non-connected state or to refuse the first SIM card to enter the non-connected state is able to meet the communication requirements for these two service types.

FIG. 6 is a schematic flowchart illustrating ye another method for a connection indication according to an embodiment of the present disclosure. As shown in FIG. 6, the determining the relationship between the first service type corresponding to the communication of the first SIM card and the second service type includes steps S601 and S602:

In step S601, preference information of the terminal on a service type sent by the terminal or a core network is received;

In step S602, a relationship between the first service type and the second service type is determined according to the preference information.

In an embodiment, the terminal or the core network may send the preference information of the terminal on the service type to the base station, and the base station may determine the relationship between the first service type and the second service type according to the preference information. For example, at least one service type preferred by the terminal may constitute a set or a list, and the base station may determine which service type among the first service type and the second service type belongs to the set or the list, and then determine which service type belongs to the service type preferred by the terminal, which service type does not belong to the service type preferred by the terminal.

In an embodiment, in response to that the first service type belongs to a service type preferred by the terminal and the second service type does not belong to the service type preferred by the terminal, the indication information is used to refuse the first SIM card to enter the non-connected state;

or in response to that the first service type does not belong to a service type preferred by the terminal and the second service type belongs to the service type preferred by the terminal, the indication information is used to indicate the first SIM card to enter the non-connected state.

In an embodiment, when it is determined that the first service type belongs to the service type preferred by the terminal, and the second service type does not belong to the service type preferred by the terminal, the first SIM card may be refused to enter the non-connected state, that is, maintain in the connected state, thereby ensuring the continuous communication of the service type preferred by the terminal and ensuring the user experience of the terminal. When it is determined that the first service type does not belong to the service type preferred by the terminal, and the second service type belongs to the service type preferred by the terminal, the first SIM card is instructed to enter the non-connected state, thereby ensuring the response to the paging of the signal service of the terminal, so as to perform the communication of the service preferred by the terminal and ensure the user experience of the terminal.

There may be one or a plurality of service types preferred by the terminal. For example, the service type preferred by the terminal is a game service. When the first service type is the game service and the second service type is a voice call service, it may be determined that the first service type belongs to the service type preferred by the terminal, and the second service type does not belong to the service type preferred by the terminal, then the request for the first SIM card to leave the connected state may be refused, indicating that the first SIM card does not continue to enter the non-connected state, so as to ensure the terminal to maintain the communication with the game service and ensure the user experience of playing the game.

FIG. 7 is a schematic flowchart illustrating yet another method for a connection indication according to an embodiment of the present disclosure. As shown in FIG. 7, the determining the relationship between the first service type corresponding to the communication of the first SIM card and the second service type includes steps S701 and S702:

In step S701, priority information on a service type sent by the terminal or a core network is received;

In step S702, a relationship between the first service type and the second service type is determined according to the priority information.

In an embodiment, the terminal or the core network may send the priority information of the terminal on the service type to the base station. The base station may determine the relationship between the first service type and the second service type according to the priority information. For example, at least one service type may constitute the priority information (such as a priority list), and the base station may determine that the first service type and the second service type are included in the priority information, which service type has a relatively high priority and which service type has a relatively low priority.

In an embodiment, in response to a priority of the first service type being higher than a priority of the second service type, the indication information is used to refuse the first SIM card to enter the non-connected state;

or in response to a priority of the first service type being lower than a priority of the second service type, the indication information is used to indicate the first SIM card to enter the non-connected state.

In an embodiment, when it is determined that the priority of the first service type is higher than the priority of the second service type, the first SIM card may be indicated not to enter the non-connected state, thereby ensuring the continuous communication of the service having the relatively high priority and ensuring the user experience of the terminal. When it is determined that the priority of the first service type is lower than the priority of the second service type, the first SIM card may be indicated to enter the non-connected state, thereby ensuring the response to the paging of the signal service of the terminal, so as to perform communication of the service having the relatively high priority and ensure the user experience of the terminal.

The priority information on the service type may include the priority of one or a plurality of services. For example, if the priority of one service is included, the highest or lowest priority of this service may be indicated. For example, if the priorities of the plurality of services are included, the priorities of the plurality of services may be ranked.

Taking the priorities of the plurality of services being included as an example, the priority of the game service is relatively high, and the priority of the voice call service is relatively low. When the first service type is the game service, and the second service type is the voice call service, it may be determined that the priority of the first service type is higher than the priority of the second service type, then the request for the first SIM card to leave the connected state may be refused, that is, the first SIM card may be refused to enter the non-connected state, such that the first SIM card continues to maintain in the connected state, so as to ensure the terminal to maintain the communication with the game service and ensure the user experience of playing the game.

FIG. 8 is a schematic flowchart illustrating a method for a connection adjustment according to an embodiment of the present disclosure. The method for the connection adjustment shown in the present embodiment may be applied to a terminal, which includes but not limited to an electronic device such as a mobile phone, a tablet, a wearable device, a sensor, and an Internet of Things device, etc. The terminal may serve as user equipment and communicate with a base station, and the based station includes but not limited to a 4G base station, a 5G base station, and a 6G base station. In an embodiment, the base station may be a base station to which a method for a connection indication described in any subsequent embodiment is applicable.

The terminal may be provided with a plurality of SIM cards, and the plurality of SIM cards at least include a first SIM card and a second SIM card. The first SIM card and the second SIM card may belong to the same operator network or belong to different operator networks.

As shown in FIG. 8, the method for a connection adjustment may include the following steps S801 and S802:

In step S801, the request information for leaving a connected state is sent to a base station by the first SIM card, and the request information includes a leaving reason for leaving the connected state;

In step S802, the first SIM card is adjusted to enter a non-connected state or not to enter a non-connected state according to indication information received from the base station.

In an embodiment, when the terminal is in the connected state, if the first SIM card needs to leave the connected state and access the non-connected state, the request information for leaving the connected state may be sent to a base station in an operator network to which the first SIM card belongs. Based on the received request information, the base station may determine that the first SIM card requests to leave the connected state.

In an embodiment, when the first SIM card is in the connected state and the second SIM card needs to perform a communication operation, causing a conflict between the communication operation of the first SIM card and the communication operation of the second SIM card, the terminal may send the request information to the base station.

For example, when the first SIM card is in the connected state for communication and the second SIM card needs to respond to paging, in this case, the terminal needs to choose one of the following for execution: continue to communicate through the first SIM card and respond to the paging through the second SIM card. Thus, there is a conflict between the communication operation of communicating with the first SIM card and the communication operation of responding to the paging through the second SIM card, such that the request information may be sent to the base station.

In an embodiment, the request information may be RRC (Radio Resource Control) information, such as UEAssistanceInformation (user equipment assistance information).

In an embodiment, the request information may include the leaving reason for leaving the connected state. According to the request information, the base station may determine the leaving reason why the first SIM card leaves the connected state, then determine whether to allow the first SIM card to leave the connected state and enter the non-connected state according to the leaving reason, and after that, send the indication information to the terminal to indicate the terminal.

If the first SIM card is allowed to enter the non-connected state, the first SIM card may enter the non-connected state by sending the indication information to the first SIM card. For example, the first SIM card may enter an idle state by sending a RRC release signaling to the first SIM card, or the first SIM card may enter an inactive state by sending a RRC suspend release signaling to the first SIM card. If the first SIM card is not allowed to enter the non-connected state, and that is, if the first SIM card needs to maintain in the connected state, the first SIM card may be refused to enter the non-connected state by sending the indication information to the first SIM card.

According to the embodiment of the present disclosure, when the first SIM card in the terminal requests to leave the connected state, it may send the request information for leaving the connected state to the base station, and carry the leaving reason for leaving the connected state in the request information, such that the base station may accurately determine whether to allow the first SIM card to leave the connected state according to the leaving reason, thereby indicating the first SIM card to enter the non-connected state or to refuse the first SIM card to enter the non-connected state, such that the first SIM card may enter the non-connected state or maintain in the connected state according to the determination of the base station.

FIG. 9 is a schematic flowchart illustrating another method for a connection adjustment according to an embodiment of the present disclosure. As shown in FIG. 9, the method further includes step S901:

In step S901, a time for the first SIM card to enter the non-connected state is determined according to the indication information.

In an embodiment, the base station may also determine the time for the first SIM card to enter the non-connected state according to the leaving reason why the first SIM card leaves the connected state, and then indicate the time to the terminal, or indicate the terminal to enter the non-connected state at this time, such that the terminal may enter the non-connected state at this time.

FIG. 10 is a schematic flowchart illustrating yet another method for a connection adjustment according to an embodiment of the present disclosure. As shown in FIG. 10, the method further includes step S1001:

In step S1001, a time for the first SIM card to re-enter the connected state after the first SIM card enters the non-connected state is determined according to the indication information.

In an embodiment, the base station may also determine the time for the first SIM card to re-enter the connected state after the first SIM card enters the non-connected state according to the leaving reason why the first SIM card leaves the connected state, and then indicate the time to the terminal, or indicate the terminal to re-enter the connected state at this time, such that the terminal may re-enter the connected state at this time.

FIG. 11 is a schematic flowchart illustrating yet another method for a connection adjustment according to an embodiment of the present disclosure. As shown in FIG. 11, the method further includes step S1101:

In step S1101, a type of the non-connected state entered by the first SIM card is determined according to the indication information.

In an embodiment, the base station may also determine the type of the non-connected state that the first SIM card enters according to the leaving reason why the first SIM card leaves the connected state, and then indicate the first SIM card to enter the non-connected state of this type when determining that the first SIM card requests to leave the connected state.

FIG. 12 is a schematic flowchart illustrating yet another method for a connection adjustment according to an embodiment of the present disclosure. As shown in FIG. 12, the request information further includes a type of the non-connected state requested to enter. the adjusting the first SIM card to enter the non-connected state or not to enter the non-connected state according to the indication information received from the base station includes step S1201:

In step S1201, it is determined that the first SIM card enters the non-connected state of the type or does not enter the non-connected state according to the indication information received from the base station.

In an embodiment, the request information sent by the terminal to the base station may further include the type of the non-connected state requested to enter, and the base station may determine the type of the non-connected state that the first SIM card requests to enter according to the request information, so as to indicate the first SIM card to enter the non-connected state of this type when that the first SIM card enters the non-connected state is determined according to the leaving reason, to meet the requirement of the first SIM card.

In an embodiment, the leaving reason includes at least one of the following:

a paging reason for paging received by a second SIM card in the terminal, and service information corresponding to the paging received by the second SIM card in the terminal.

In an embodiment, the leaving reason carried in the request information may be either the paging reason for the paging received by the second SIM card or the service information corresponding to the paging received by the second SIM card. Based on the paging reason or the service information, the base station may determine a second service type corresponding to the paging received by the second SIM card, and the base station knows a first service type of the ongoing communication operation of the first SIM card, and thus it may be determined whether to allow the first SIM card to leave the connected state according to a relationship between the first service type and the second service type.

FIG. 13 is a schematic flowchart illustrating yet another method for a connection adjustment according to an embodiment of the present disclosure. As shown in FIG. 13, the method further includes step S1301:

In step S1301, the preference information of the terminal on a service type is sent to the base station.

In an embodiment, the terminal may send the preference information of the terminal on the service type to the base station, and the base station may determine the relationship between the first service type and the second service type according to the preference information. For example, at least one service type preferred by the terminal may constitute a set or a list, and the base station may determine which service type among the first service type and the second service type belongs to the set or the list, and then determine which service type belongs to the service type preferred by the terminal, which service type does not belong to the service type preferred by the terminal.

FIG. 14 is a schematic flowchart illustrating yet another method for a connection adjustment according to an embodiment of the present disclosure. As shown in FIG. 14, the determining the relationship between the first service type corresponding to the communication of the first SIM card and the second service type includes step S1401:

In step S1401, priority information on a service type is sent to the base station.

In an embodiment, the terminal may send the priority information of the terminal on the service type to the base station. The base station may determine the relationship between the first service type and the second service type according to the priority information. For example, at least one service type may constitute the priority information (such as a priority list), and the base station may determine that the first service type and the second service type are included in the priority information, which service type has a relatively high priority and which service type has a relatively low priority.

Corresponding to the foregoing embodiments of the method for the connection indication and the method for the connection adjustment, the present disclosure also provides embodiments of an apparatus for a connection indication and an apparatus for a connection adjustment.

FIG. 15 is a schematic block diagram illustrating an apparatus for a connection indication shown according to an embodiment of the present disclosure. The apparatus for the connection indication shown in the present embodiment may be applied to a base station, which includes but is not limited to, a 4G base station, a 5G base station, and a 6G base station. The base station may communicate with a terminal serving as user equipment, and the terminal includes but not limited to, an electronic device such as a mobile phone, a tablet, a wearable device, a sensor, and an Internet of Things device, etc. In an embodiment, the terminal may be a terminal to which the apparatus for the connection adjustment described in any subsequent embodiment is applicable.

The terminal may be provided with a plurality of SIM cards, and the plurality of SIM cards at least include a first SIM card and a second SIM card. The first SIM card and the second SIM card may belong to the same operator network or belong to different operator networks.

As shown in FIG. 15, the apparatus for the connection indication may include a request receiving module 1501 and a connection indication module 1502:

the request receiving module 1501 is configured to receive request information for leaving a connected state sent by the first SIM card in the terminal, and the request information includes a leaving reason for leaving the connected state;

the connection indication module 1502 is configured to send indication information to the terminal according to the leaving reason, the indication information is used to indicate that the first SIM card enters a non-connected state or to refuse the first SIM card to enter the non-connected state.

FIG. 16 is a schematic block diagram illustrating another apparatus for the connection indication shown according to an embodiment of the present disclosure. As shown in FIG. 16, the apparatus further includes a first time determination module 1601:

the first time determination module 1601 is configured to determine a time for the first SIM card to enter the non-connected state according to the leaving reason.

FIG. 17 is a schematic block diagram illustrating yet another apparatus for the connection indication shown according to an embodiment of the present disclosure. As shown in FIG. 17, the apparatus further includes a second time determination module 1701:

the second time determination module 1701 is configured to determine a time for the first SIM card to re-enter the connected state after the first SIM card enters the non-connected state according to the leaving reason.

Figure 18:
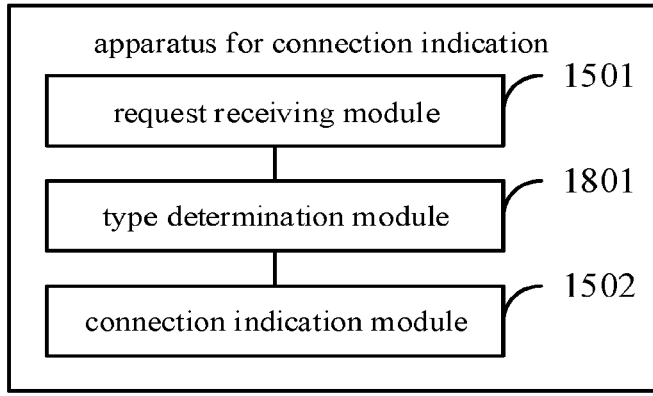
FIG. 18 is a schematic block diagram illustrating yet another apparatus for a connection indication shown according to an embodiment of the present disclosure.

FIG. 18 is a schematic block diagram illustrating yet another apparatus for the connection indication shown according to an embodiment of the present disclosure. As shown in FIG. 18, the apparatus further includes a type determination module 1801:

the type determination module 1801 is configured to determine a type of the non-connected state entered by the first SIM card according to the leaving reason.

In an embodiment, the request information further includes a type of the non-connected state requested to enter, and the indication information is used to indicate the first SIM card to enter the non-connected state of the type or to refuse the first SIM card to enter the non-connected state.

In an embodiment, the leaving reason includes at least one of the following:

a paging reason for paging received by a second SIM card in the terminal, and service information corresponding to the paging received by the second SIM card in the terminal.

Figure 19:
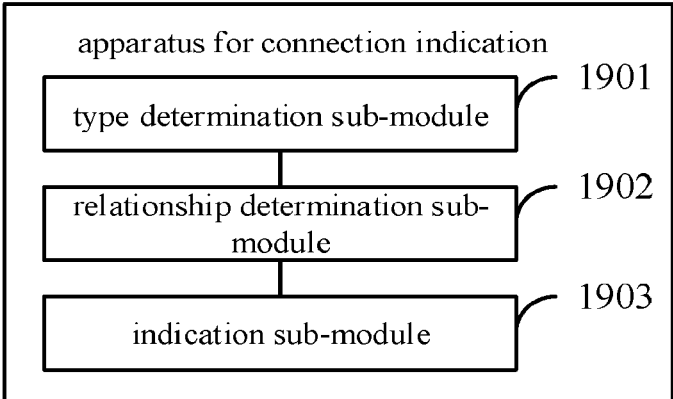
FIG. 19 is a schematic block diagram illustrating yet another apparatus for a connection indication shown according to an embodiment of the present disclosure.

FIG. 19 is a schematic block diagram illustrating yet another apparatus for the connection indication shown according to an embodiment of the present disclosure. As shown in FIG. 19, the connection indication module includes a type determination sub-module 1901, a relationship determination sub-module 1902 and an indication sub-module 1903:

the type determination sub-module 1901 is configured to determine a second service type corresponding to the paging received by the second SIM card according to the paging reason or the service information;

the relationship determination sub-module 1902 is configured to determine a relationship between the first service type corresponding to communication of the first SIM card and the second service type;

the indication sub-module 1903 is configured to send indication information to the terminal according to the relationship.

In an embodiment, the relationship determination sub-module is configured to receive preference information of the terminal on a service type sent by the terminal or a core network; determine the relationship between the first service type and the second service type according to the preference information.

In an embodiment, in response to that the first service type belongs to a service type preferred by the terminal and the second service type does not belong to the service type preferred by the terminal, the indication information is used to refuse the first SIM card to enter the non-connected state; or in response to that the first service type does not belong to a service type preferred by the terminal and the second service type belongs to the service type preferred by the terminal, the indication information is used to indicate the first SIM card to enter the non-connected state.

In an embodiment, the relationship determination sub-module is configured to receive priority information on a service type sent by the terminal or a core network; determine the relationship between the first service type and the second service type according to the priority information.

In an embodiment, in response to a priority of the first service type being higher than a priority of the second service type, the indication information is used to refuse the first SIM card to enter the non-connected state; or in response to a priority of the first service type being lower than a priority of the second service type, the indication information is used to indicate the first SIM card to enter the non-connected state.

Figure 20:
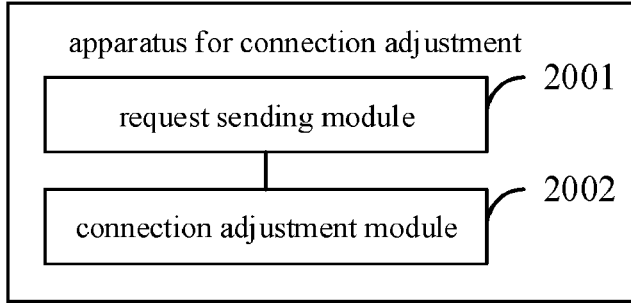
FIG. 20 is a schematic block diagram illustrating an apparatus for a connection adjustment according to an embodiment of the present disclosure.

FIG. 20 is a schematic block diagram illustrating an apparatus for a connection adjustment according to an embodiment of the present disclosure. The apparatus for the connection adjustment shown in the present embodiment may be applied to a terminal, which includes but not limited to an electronic device such as a mobile phone, a tablet, a wearable device, a sensor, and an Internet of Things device, etc. The terminal may serve as user equipment and communicate with a base station, and the based station includes but not limited to a 4G base station, a 5G base station, and a 6G base station. In an embodiment, the base station may be a base station to which the apparatus for the connection indication described in any subsequent embodiment is applicable.

The terminal may be provided with a plurality of SIM cards, and the plurality of SIM cards at least include a first SIM card and a second SIM card. The first SIM card and the second SIM card may belong to the same operator network or belong to different operator networks.

As shown in FIG. 20, the apparatus for the connection adjustment may include a request sending module 2001 and a connection adjustment module 2002:

the request sending module 2001 is configured to send request information for leaving a connected state to a base station by the first SIM card, the request information includes a leaving reason for leaving the connected state;

the connection adjustment module 2002 is configured to adjust the first SIM card to enter a non-connected state or not to enter the non-connected state according to the indication information received from the base station.

Figure 21:
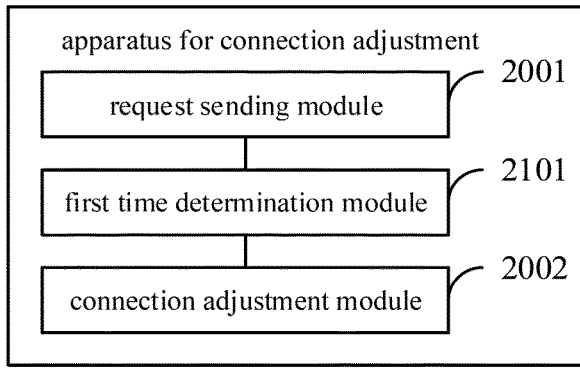
FIG. 21 is a schematic block diagram illustrating another apparatus for a connection adjustment shown according to an embodiment of the present disclosure.

FIG. 21 is a schematic block diagram illustrating another apparatus for a connection adjustment shown according to an embodiment of the present disclosure. As shown in FIG. 21, the apparatus further includes a first time determination module 2101:

the first time determination module 2101 is configured to determine a time for the first SIM card to enter the non-connected state according to the indication information.

Figure 22:
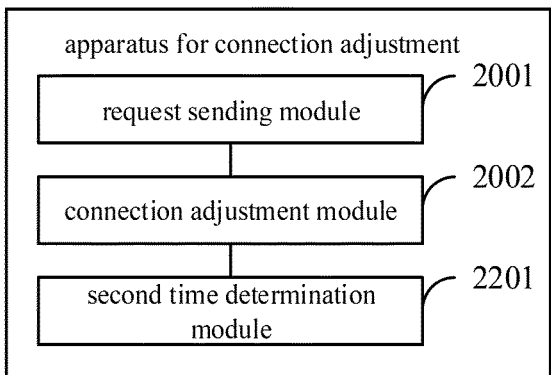
FIG. 22 is a schematic block diagram illustrating yet another apparatus for a connection adjustment according to an embodiment of the present disclosure.

FIG. 22 is a schematic block diagram illustrating yet another apparatus for the connection adjustment according to an embodiment of the present disclosure. As shown in FIG. 22, the apparatus further includes a second time determination module 2201:

the second time determination module 2201 is configured to determine a time for the first SIM card to re-enter the connected state after the first SIM card enters the non-connected state according to the indication information.

Figure 23:
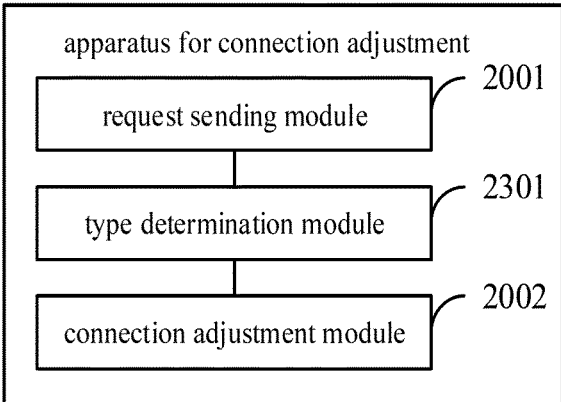
FIG. 23 is a schematic block diagram illustrating yet another apparatus for a connection adjustment according to an embodiment of the present disclosure.

FIG. 23 is a schematic block diagram illustrating yet another apparatus for the connection adjustment according to an embodiment of the present disclosure. As shown in FIG. 23, the apparatus further includes a type determination module 2301:

the type determination module 2301 is configured to determine a type of the non-connected state entered by the first SIM card according to the indication information.

In an embodiment, the request information further includes a type of the non-connected state requested to enter, and the connection adjustment module is configured to determine that the first SIM card enters the non-connected state of the type or does not enter the non-connected state according to the indication information received from the base station.

In an embodiment, the leaving reason includes at least one of the following:

a paging reason for paging received by a second SIM card in the terminal, and service information corresponding to the paging received by the second SIM card in the terminal.

Figure 24:
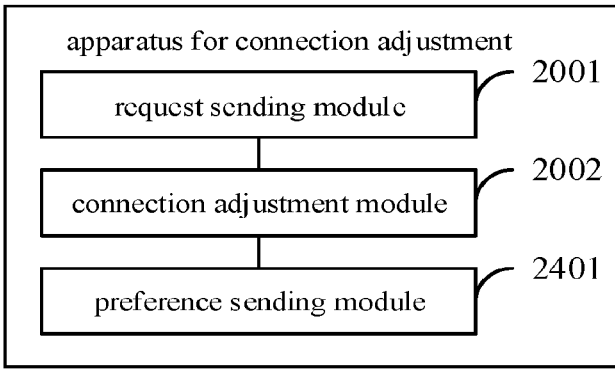
FIG. 24 is a schematic block diagram illustrating yet another apparatus for a connection adjustment according to an embodiment of the present disclosure.

As shown in FIG. 24, the apparatus further includes a preference sending module 2401:

The preference sending module 2401 is configured to send the preference information of the terminal on the service type to the base station.

Figure 25:
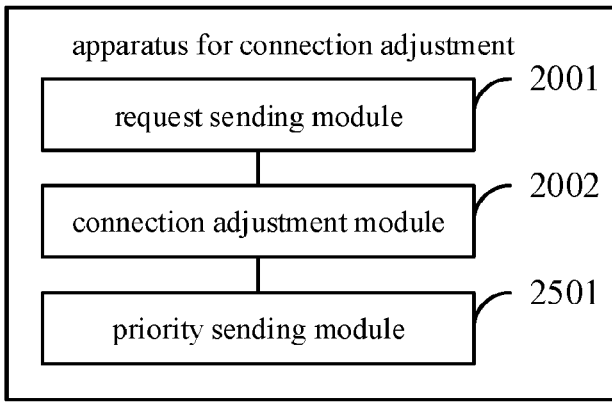
FIG. 25 is a schematic block diagram illustrating yet another apparatus for a connection adjustment according to an embodiment of the present disclosure.

FIG. 25 is a schematic block diagram illustrating yet another apparatus for the connection adjustment according to an embodiment of the present disclosure. As shown in FIG. 25, the apparatus includes a priority sending module 2501:

the priority sending module 2501 is configured to send priority information on a service type to the base station.

With respect to the apparatus in the above embodiments, the specific manner in which each module performs its operation is already described in detail in the relevant method embodiment, and will not be repeated here.

For the apparatus embodiments, since it corresponds generally to the method embodiments, it is sufficient to refer to the method embodiments for the relevant part of the description. The apparatus embodiments described above are merely schematic, where the modules described as separate components may or may not be physically separated, and the components shown as modules may or may not be physical modules, i.e., they may be located in one place or may be distributed to multiple network modules. Some or all of these modules can be selected according to practical needs to achieve the purpose of the solution of the embodiments. It can be understood and implemented by a person of ordinary skill in the art without departing from this application.

The embodiments of the present disclosure further provides an electronic device, and the electronic device includes:

a processor;

a memory configured to store instructions executable by the processor;

where the processor is configured to execute the method for the connection indication described in any one of above embodiments.

The embodiments of the present disclosure further provides an electronic device, and the electronic device includes:

a processor;

a memory configured to store instructions executable by the processor;

where the processor is configured to execute the method for the connection adjustment described in any one of above embodiments.

The embodiments of the present disclosure further provides a computer-readable storage medium storing a computer program, where the program, when executed by a processor, implements steps in the method for connection indication described in any one of above embodiments.

The embodiments of the present disclosure further provides a computer-readable storage medium storing a computer program, where the program, when executed by a processor, implements steps in the method for connection adjustment described in any one of above embodiments.

Figure 26:
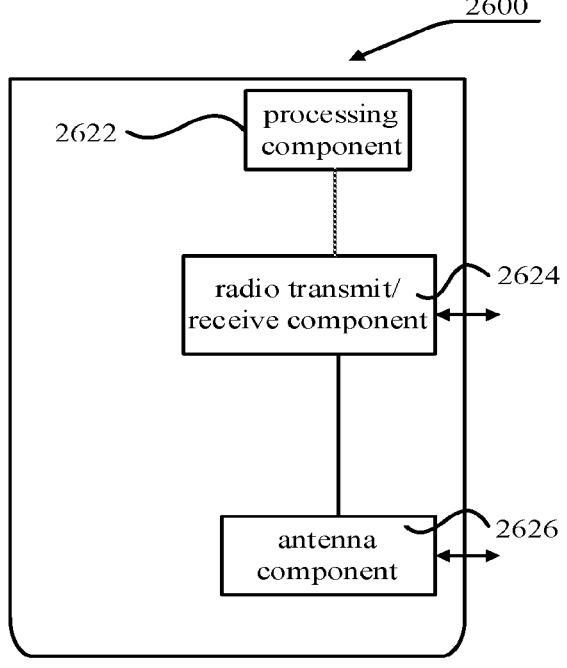
FIG. 26 is a schematic block diagram illustrating an apparatus for a connection indication shown according to an embodiment of the present disclosure.

As shown in FIG. 26, FIG. 26 is a schematic block diagram of an apparatus 2600 for connection indication illustrated according to the embodiments of the present disclosure. The apparatus 2600 may be served as a base station. Referring to FIG. 26, the apparatus 2600 includes a processing component 2622, a radio transmit/receive component 2624, an antenna component 2626, and a signal processing portion specific to the radio interface, and the processing component 2622 may further include one or more processors. One of the processors in the processing component 2622 may be configured to implement the method for the connection indication as described in any one of above embodiments.

Figure 27:
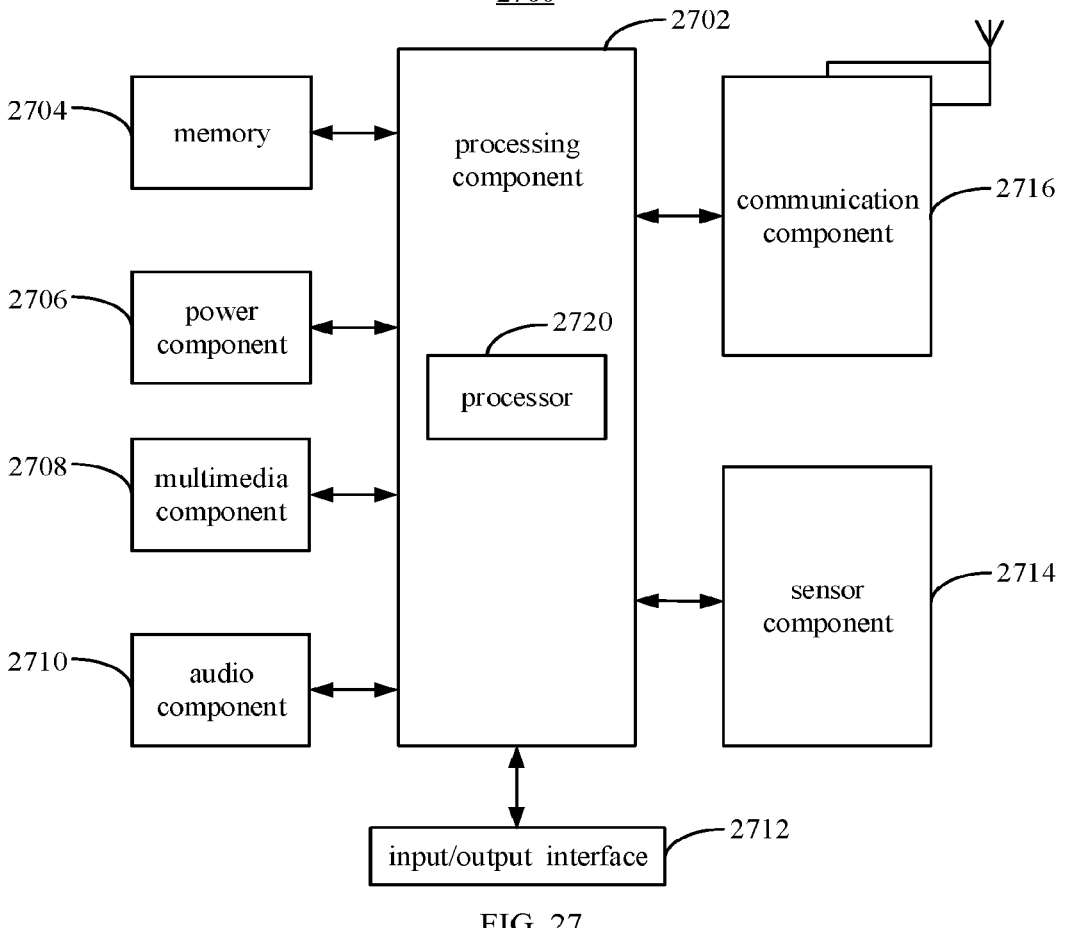
FIG. 27 is a schematic block diagram illustrating an apparatus for a connection adjustment shown according to an embodiment of the present disclosure.

FIG. 27 is a schematic block diagram of an apparatus 2700 for a connection adjustment illustrated according to the embodiments of the present disclosure. For example, the apparatus 2700 may be may be a cell phone, a computer, a digital broadcast terminal, a message sending and receiving device, a game console, a tablet device, a medical device, a fitness device, a personal digital assistant, and the like.

Referring to FIG. 27, the apparatus 2700 may include one or more of the following components: a processing component 2702, a memory 2704, a power component 2706, a multimedia component 2708, an audio component 2710, an input/output (I/O) interface 2712, a sensor component 2714, and a communication component 2716.

The processing component 2702 typically controls the overall operation of the apparatus 2700, such as operations associated with display, phone call, data communication, camera operation, and recording operations. The processing component 2702 may include one or more processors 2720 to execute instructions to complete all or some of the steps of the method for the connection adjustment described above. In addition, the processing component 2702 may include one or more modules that facilitate interaction between processing component 2702 and other components. For example, processing component 2702 may include a multimedia module to facilitate interaction between multimedia component 2708 and processing component 2702.

The memory 2704 is configured to store various types of data to support operation at the apparatus 2700. Examples of such data include instructions for any application or method of operation on the apparatus 2700, contact data, phonebook data, messages, images, videos, etc. The memory 2704 can be implemented by any type of transitory or non-transitory storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 2706 provides power to the various components of the apparatus 2700. The power component 2706 may include a power management system, one or more power supplies, and other components associated with generating, managing, and distributing power for the apparatus 2700.

The multimedia component 2708 includes a screen providing an output interface between the apparatus 2700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 2708 includes a front-facing camera and/or a rear-facing camera. The front camera and/or rear camera can receive external multimedia data when the apparatus 2700 is in an operating mode, such as shooting mode or video mode. Each front camera and rear camera may be a fixed optical lens system or have focal length and optical zoom capability.

The audio component 2710 is configured to output and/or input audio signals. For example, the audio component 2710 includes a microphone (MIC) configured to receive external audio signals when the apparatus 2700 is in an operating mode, such as call mode, recording mode, and voice recognition mode. The received audio signal may be further stored in memory 2704 or sent via communication component 2716. In some embodiments, the audio component 2710 further includes a speaker for outputting audio signals.

The I/O interface 2712 provides an interface between processing component 2702 and a peripheral interface module, the peripheral interface module may be a keyboard, click wheel, button, etc. These buttons may include, but are not limited to: a home button, a volume button, a start button, and a lock button.

The sensor component 2714 includes one or more sensors for providing status assessment of various aspects of the apparatus 2700. For example, the sensor component 2714 may detect an open/closed state of the apparatus 2700, the relative positioning of components, such as the components being the display and keypad of the apparatus 2700, the sensor component 2714 may also detect a change in position of the apparatus 2700 or a component of the apparatus 2700, the presence or absence of user contact with the apparatus 2700, the orientation or acceleration/deceleration of the apparatus 2700 and temperature changes of the apparatus 2700. The sensor component 2714 may include a proximity sensor configured to detect the presence of a nearby object in the absence of any physical contact. The sensor component 2714 may also include a light sensor, such as a CMOS or CCD image sensor, for use in imaging applications. In some embodiments, the sensor component 2714 may also include an accelerometer sensor, a gyroscope sensor, a magnetic sensor, a pressure sensor, or a temperature sensor.

The communication component 2716 is configured to facilitate communication between the apparatus 2700 and other devices by wired or wireless means. The apparatus 2700 may access a wireless network based on a communication standard, such as WiFi, 2G, 3G, 4G (LTE), 5G, or a combination thereof. In one embodiment, communication component 2716 receives broadcast signals or broadcast-related information from an external broadcast management system via a broadcast channel. In an embodiment, the communication component 2716 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the apparatus 2700 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method for the connection adjustment as described in any one of the above embodiments.

In some embodiments, there is also provided a non-transitory computer readable storage medium including instructions, such as a memory 2704 including instructions, the instructions being executable by the processor 2720 of the apparatus 2700 to accomplish the method described above. For example, said non-transitory computer readable storage medium may be ROM, random access memory (RAM), CD-ROM, magnetic tape, floppy disk, and optical data storage devices, among others.

According to a first aspect of embodiments of the present disclosure, a method for a connection indication is provided, the method is applied to a base station and includes:

receiving request information for leaving a connected state sent by a first SIM card in a terminal, wherein the request information includes a leaving reason for leaving the connected state;

sending, according to the leaving reason, indication information to the terminal, wherein the indication information is used to indicate the first SIM card to enter a non-connected state or to refuse the first SIM card to enter the non-connected state.

According to a second aspect of embodiments of the present disclosure, a method for a connection adjustment is provided, the method is applied to a terminal, wherein at least a first SIM card and a second SIM card are provided in the terminal, and the method includes:

sending, by the first SIM card, request information for leaving a connected state to a base station, wherein the request information includes a leaving reason for leaving the connected state;

adjusting, according to indication information received from the base station, the first SIM card to enter a non-connected state or not to enter the non-connected state.

According to a third aspect of embodiments of the present disclosure, an apparatus for a connection indication is provided, the apparatus is applied to a base station and includes:

a request receiving module, configured to receive request information for leaving a connected state sent by a first SIM card in a terminal, wherein the request information includes a leaving reason for leaving the connected state;

a connection indication module, configured to send indication information to the terminal according to the leaving reason, wherein the indication information is used to indicate the first SIM card to enter a non-connected state or to refuse the first SIM card to enter the non-connected state.

According to a fourth aspect of embodiments of the present disclosure, an apparatus for a connection adjustment is provided, the apparatus is applied to a terminal, wherein at least a first SIM card and a second SIM card are provided in the terminal, and the apparatus includes:

a request sending module, configured to send request information for leaving a connected state to a base station by the first SIM card, wherein the request information includes a leaving reason for leaving the connected state;

a connection adjustment module, configured to adjust the first SIM card to enter a non-connected state or not to enter the non-connected state according to indication information received from the base station.

According to a fifth aspect of embodiments of the present disclosure, an electronic device is provided and includes:

a processor;

a memory configured to store instructions executable by the processor;

wherein the processor is configured to execute: the above method for the connection indication.

According to a sixth aspect of embodiments of the present disclosure, an electronic device, including:

a processor;

a memory configured to store instructions executable by the processor;

wherein the processor is configured to execute the above method for the connection adjustment.

According to a seventh aspect of embodiments of the present disclosure, a computer-readable storage medium having a computer program stored thereon, when the computer program is executed by a processor, steps in the above method for the connection indication are implemented.

According to an eighth aspect of embodiments of the present disclosure, a computer-readable storage medium having a computer program stored thereon, when the computer program is executed by a processor, steps in the above method for the connection adjustment are implemented.

According to the embodiment of the present disclosure, when the first SIM card in the terminal requests to leave the connected state, it may send the request information for leaving the connected state to the base station, and carry the leaving reason for leaving the connected state in the request information, such that the base station may accurately determine whether to allow the first SIM card to leave the connected state or not to enter the non-connected state according to the leaving reason, thereby indicating the first SIM card to enter the non-connected state or not to enter the non-connected state.

Those skilled in the art will easily expect other embodiments of the present disclosure upon consideration of the specification and practice of the disclosure disclosed herein. This disclosure is intended to cover any variations, uses, or adaptations of the present disclosure that follow the general principles of the present disclosure and include commonly known or customary technical means in the art that are not disclosed herein. The specification and embodiments are considered exemplary only, and the true scope and spirit of the present disclosure is indicated by the following claims.

It should be understood that the present disclosure is not limited to the precise structure already described above and illustrated in the accompanying drawings, and that various modifications and changes may be made without departing from its scope. The scope of the present disclosure is limited only by the appended claims.

It is noted that in this document, relationship terms such as "first" and "second" are used only to distinguish one entity or operation from another, and do not necessarily require or imply any such actual relationship or order between these entities or operations. The term "includes," "comprises," or any other variation thereof, is intended to cover non-exclusive inclusion so that a process, method, article, or apparatus that includes a set of elements includes not only those elements, but also other elements not explicitly listed, or also includes the process, method, article, or apparatus for which such process, method, article, or apparatus is intended, or further include elements that are inherent to such process, method, article, or apparatus. Without further limitation, the elements defined by the statement "including a/an . . . " do not preclude the existence of additional identical elements in the process, method, article, or device that includes the elements.

The method and apparatus provided by the embodiments of the present disclosure are described in detail above, and specific examples are used to illustrate the principles and implementation of the present disclosure. The above description of the embodiments is only used to help understand the method of the present disclosure and its core ideas; at the same time, for a person of ordinary skill in the art, there will be changes in the specific implementation and scope of application based on the ideas of the present disclosure, and in summary, the contents of this specification should not be construed as a limitation of the present disclosure.

What is claimed is:

1. A method for a connection indication, performed by a base station, comprising:

receiving request information for leaving a connected state sent by a first subscriber identity module (SIM) card in a terminal, wherein the request information comprises a leaving reason for leaving the connected state;

sending, according to the leaving reason, indication information to the terminal, wherein the indication information is used to indicate the first SIM card to enter a non-connected state or to refuse the first SIM card to enter the non-connected state;

wherein the method further comprises: in a case that the indication information is used to indicate the first SIM card to enter the non-connected state, determining a type of the non-connected state the first SIM card enters according to the leaving reason; wherein the type of the non-connected state comprises an idle state and an inactive state;

wherein in a case that the leaving reason is that a communication operation of the first SIM card conflicts with a communication operation of a second SIM card of the terminal, the base station determines the type of the non-connected state the first SIM card enters, either the idle state or the inactive state, according to a duration of the communication operation required by the second SIM card.

2. The method according to claim 1, further comprising:

determining, according to the leaving reason, a time for the first SIM card to enter the non-connected state.

3. The method according to claim 1, further comprising:

determining, according to the leaving reason, a time for the first SIM card to re-enter the connected state after the first SIM card enters the non-connected state.

4. The method according to claim 1, wherein the request information further comprises the type of the non-connected state requested to enter, and the indication information is used to indicate the first SIM card to enter the non-connected state of the type or to refuse the first SIM card to enter the non-connected state.

5. The method according to claim 1, wherein the leaving reason comprises at least one of the following:
    a paging reason for paging received by the second SIM card in the terminal, and service information corresponding to the paging.

6. The method according to claim 5, wherein the sending, according to the leaving reason, the indication information to the terminal comprises:
    determining, according to the paging reason or the service information, a second service type corresponding to the paging;
    determining a relationship between a first service type corresponding to communication of the first SIM card and the second service type;
    sending, according to the relationship, the indication information to the terminal.

7. The method according to claim 6, wherein the determining the relationship between the first service type and the second service type comprises:
    receiving information of the terminal on a service type sent by the terminal or a core network;
    determining, according to the preference information, the relationship between the first service type and the second service type.

8. The method according to claim 7, wherein in response to that the first service type belongs to a service type preferred by the terminal and the second service type does not belong to the service type preferred by the terminal, the indication information is used to refuse the first SIM card to enter the non-connected state;
    or
    in response to that the first service type does not belong to a service type preferred by the terminal and the second service type belongs to the service type preferred by the terminal, the indication information is used to indicate the first SIM card to enter the non-connected state.

9. The method according to claim 6, wherein the determining the relationship between the first service type and the second service type comprises
    receiving priority information on a service type sent by the terminal or a core network;
    determining, according to the priority information, the relationship between the first service type and the second service type.

10. The method according to claim 9, wherein in response to a priority of the first service type being higher than a priority of the second service type, the indication information is used to refuse the first SIM card to enter the non-connected state;
    or
    in response to a priority of the first service type being lower than a priority of the second service type, the indication information is used to indicate the first SIM card to enter the non-connected state.

11. A method for a connection adjustment, applied to a terminal, wherein at least a first subscriber identity module (SIM) card and a second SIM card are provided in the terminal, and the method comprises:
    sending, by the first SIM card, request information for leaving a connected state to a base station, wherein the request information comprises a leaving reason for leaving the connected state;

adjusting, according to indication information received from the base station, the first SIM card to enter a non-connected state or not to enter the non-connected state;
    wherein in a case that the indication information is used to indicate the first SIM card to enter the non-connected state, a type of the non-connected state the first SIM card enters is determined by the base station according to the leaving reason; wherein the type of the non-connected state comprises an idle state and an inactive state;
    wherein in a case that the leaving reason is that a communication operation of the first SIM card conflicts with a communication operation of the second SIM card, the type of the non-connected state the first SIM card enters, either the idle state or the inactive state, is determined by the base station according to a duration of the communication operation required by the second SIM card.

12. The method according to claim 11, further comprising:
    determining, according to the indication information, a time for the first SIM card to enter the non-connected state.

13. The method according to claim 11, further comprising:
    determining, according to the indication information, a time for the first SIM card to re-enter the connected state after the first SIM card enters the non-connected state.

14. The method according to claim 11, wherein the request information further comprises the type of the non-connected state requested to enter, and the adjusting, according to the indication information, the first SIM card to enter the non-connected state or not to enter the non-connected state comprises:
    determining, according to the indication information, that the first SIM card enters the non-connected state of the type or does not enter the non-connected state.

15. The method according to claim 11, wherein the leaving reason comprises at least one of the following:
    a paging reason for paging received by the second SIM card in the terminal, and service information corresponding to the paging.

16. The method according to claim 15, further comprising:
    sending preference information of the terminal on a service type to the base station; or
    sending priority information on a service type to the base station.

17. An electronic device, comprising:
    a processor; and
    a memory configured to store instructions executable by the processor;
    wherein the processor is configured to execute the method for the connection adjustment according to claim 11.

18. An electronic device, comprising:
    a processor; and
    a memory configured to store instructions executable by the processor;
    wherein the processor is configured to:
    receive request information for leaving a connected state sent by a first subscriber identity module (SIM) card in a terminal, wherein the request information comprises a leaving reason for leaving the connected state;
    send, according to the leaving reason, indication information to the terminal, wherein the indication information is used to indicate the first SIM card to enter a non-connected state or to refuse the first SIM card to enter the non-connected state;

wherein in a case that the indication information is used to indicate the first SIM card to enter the non-connected state, the processor is further configured to:

determine a type of the non-connected state the first SIM card enters according to the leaving reason; wherein the type of the non-connected state comprises an idle state and an inactive state;

wherein in a case that the leaving reason is that a communication operation of the first SIM card conflicts with a communication operation of a second SIM card of the terminal, the processor is configured to:

determine the type of the non-connected state the first SIM card enters, either the idle state or the inactive state, according to a duration of the communication operation required by the second SIM card.

\* \* \* \* \*